Dec. 19, 1933.    L. DOTZER ET AL    1,939,672
METHOD AND MEANS FOR MAKING FILMS OR LAYERS AND CONDITIONING
THE TEMPERATURE OF VISCOUS MASSES
Filed Nov. 9, 1931    2 Sheets-Sheet 1

INVENTORS
Leonard Dotzer
Rudolf M. Poverud
BY C. P. Goepel
their ATTORNEY

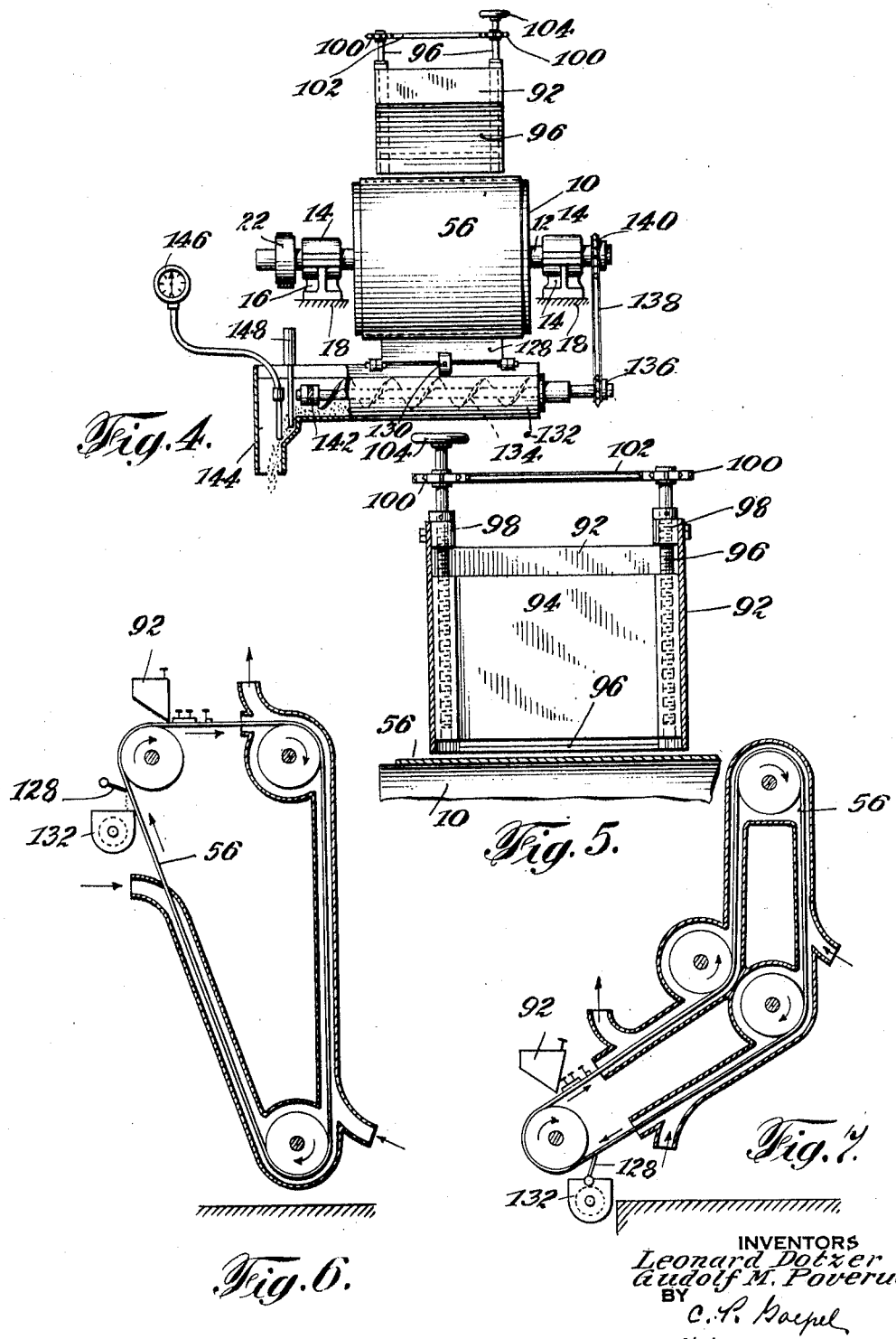

Patented Dec. 19, 1933

1,939,672

UNITED STATES PATENT OFFICE 1,939,672

METHOD AND MEANS FOR MAKING FILMS OR LAYERS AND CONDITIONING THE TEMPERATURE OF VISCOUS MASSES

Leonard Dotzer, Brooklyn, N. Y., and Gudolf Marinius Poverud, Solbakken, England Application November 9, 1931. Serial No. 573,756

3 Claims. (Cl. 257—23)

This invention relates to method and means for making films or layers and conditioning the temperature of viscous masses, such as chocolate and the like. More particularly, it relates to means and a method for continuously conditioning the temperature of chocolate prior to molding the same.

One of the outstanding difficulties encountered in the chocolate and other industries, dealing with the preparation and treatment of viscous materials, is that of properly controlling the temperature of the materials in order to make them suitable for kneading, molding, or hardening.

To cope with such difficulty, relatively expensive apparatus or devices are now sold, but only to a limited extent, this being apparently due to the prohibitive cost. Furthermore, many of the devices now on the market are adapted for the treatment of viscous masses in batch form. In order to meet the above situations, the main object of this invention is to provide a relatively cheap, simple, and efficient device for continuously conditioning viscous masses.

Another object of the invention is to provide a method for continually forming a relatively thin layer of a viscous mass moved along an endless path, and subjecting the moving layer to the counter-current action of a conditioning fluid medium.

In view of the above objects, the working of the chocolate or other viscous mass may be controlled to such an extent that it may be easily cooled or heated in accordance with the requirements of the specific mass.

With the above and other objects in view, the invention in its preferred form includes a pair or rotatable drums around which is carried an endless conveyor belt. The belt is adapted for rapid conduction of heat or cold so that when passing through a cold or hot medium, the chocolate thereon is easily affected. One of said drums is actuated by a motor with a variable speed control mechanism for increasing the rotary speed of the drum and incidentally of the belt which, in turn, drives the other drum. One of the drums and a substantial portion of the belt are enclosed in a casing or housing to form a chamber provided with horizontally extending conduits in superposed parallel planes for the passage therethrough of the belt carrying the chocolate film thereon. One of the extending conduits is provided with inlet ducts having thermostatically controlled means for regulating the entry of a conditioning fluid medium into the casing in streams counter to the movement of the belt with the chocolate film thereon, while the other conduit is provided with an outlet for the discharge of the spent medium. The speed of the belt may be varied and the chocolate film mass carried thereon may be heated or cooled to any desired temperature by the operation of the thermostatically controlled conduit inlets. Included in the embodiment are a hopper in contact with the belt, and adjustable scrapers adjacent the inlet of one of the conduits and above the belt surface in order to lay a thin film mass of chocolate on the belt. The chocolate film on the belt is then carried through the casing and through the outlet. During its travel through the casing, the film is subjected to the cooling or heating action of the conditioning fluid medium introduced counter-current to the movement of the film into the chamber through the inlet ducts of one of the conduits. After having been carried out of the chamber and conduits of the casing, the conditioned chocolate film on the belt is scraped off by a scraping device abutting the belt and collected into a hopper or mixer of a molding machine. Said mixer is provided with thermometer-recording and thermostatic control means. The latter is in communication with a control box for regulating the flow of the conduitioning fluid medium through the casing and is responsive to the variations in temperature of the chocolate scrapings collected in the mixer.

The invention further consists in the new and novel features of construction and the new and novel arrangement and combination of parts hereinafter described and more particularly set forth in the appended claims.

Referring in detail to the drawings wherein are shown simple and practical embodiments of the invention and in which similar reference characters designate corresponding parts throughout the several views:—

Fig. 4 is an end view on line 4—4 of Fig. 2;

Fig. 5 is a sectional view on line 5—5 of Fig. 2 showing the form of hopper used in the embodiment;

Figure 1:
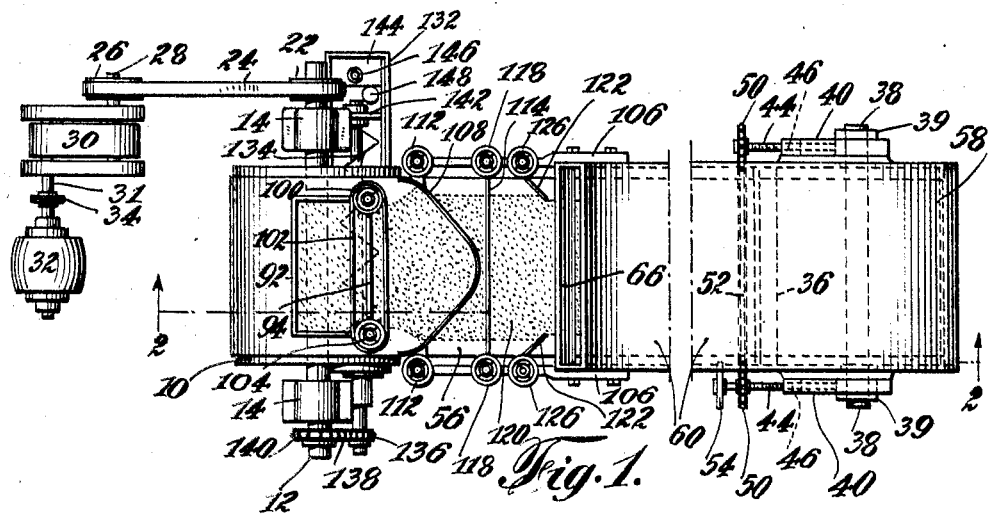
Figure 1 is a plan view with a part cut away, showing one embodiment of the invention.
Figure 2:
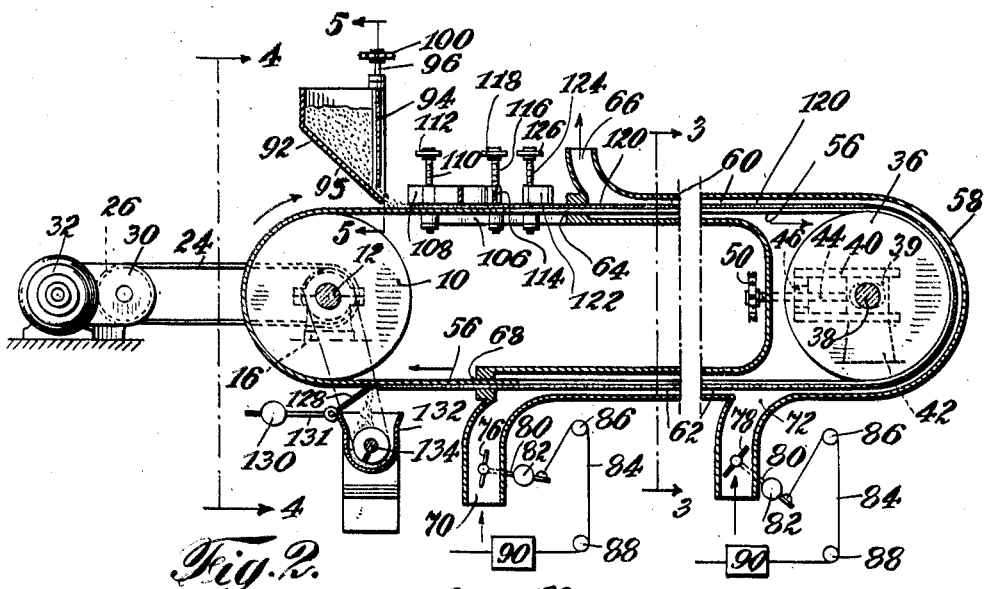
Fig. 2 is a cross section taken on line 2—2 of Fig. 1.
Figure 3:
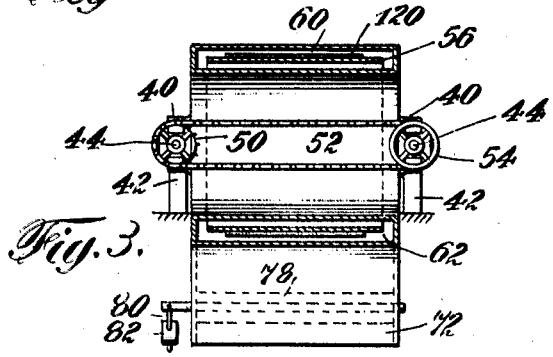
Fig. 3 is a sectional view on line 3—3 of Fig. 2.

Fig. 6 diagrammatically illustrates a vertical type of the embodiment shown in Fig. 2; and Fig. 7 diagrammatically illustrates another modification or an inclined type of the embodiment in Fig. 2.

Referring in detail to Figs. 1 to 5, inclusive, of the drawings, which, for the sake of illustration and clarity, show the preferred embodiment of the invention, a rotatable drum 10 is provided with a shaft 12 extending axially therefrom and resting on the stationary bearings 14 of floor stands 16. The drum 10 may be made of any desirable material, preferably of steel or other suitable metal. The floor stands 16 may be set on concrete bases 18 which in turn are set into the flooring of the place where the apparatus is installed. One end of shaft 12 carries a pulley 22 firmly engaged thereon for carrying a belt 24 which is also carried by another pulley 26 engaged on the shaft 28 of a variable speed transmission gear mechanism 30. One of the shafts 31 of the variable speed mechanism 30 is coupled to the shaft of an electric motor 32 by means of a coupling 34. The speed of mechanism 30 may be varied by any well-known means in order to control or regulate the rotary speed of the drum 10.

Arranged in the same horizontal plane and at any desired interval from drum 10, is set another drum 36 of the same construction and diameter as drum 10. The drum shaft 38 is set at its ends on horizontally slidable and adjustable bearings 39. The said bearings are mounted to slide along rails 40 of a floor stand frame 42 resting on a concrete base, as in the case of drum 10. Connecting each bearing 38 is a horizontally disposed screw shaft 44 running through the threaded portion of the front member 46 of the floor stand frame 42. Each screw shaft 44 is provided with a sprocket wheel 50. In order that both screw shafts 44 may be turned simultaneously when the bearing 38 is to be adjusted, an endless sprocket chain 52 is provided. One of the shafts has an extending portion onto the end of which is engaged a hand wheel 54, so that when the drum 36 is to be moved horizontally along the rails 40, the wheel 54 may be rotated, thereby simultaneously rotating both sprocket wheels 50. In such manner, the force is evenly distributed through each member 46 to slide the drum backwards or forwards. The adjustment of the drum in this manner will maintain its axial center in substantially the same horizontal plane as that of drum 10.

The drum 36 is rotatable in the bearings 39 and is driven by means of an endless conveyor belt 56 carried by both drums 10 and 36. Said belt 56 may be made of any type of material such as leather, felt, asbestos, and the like commonly used for carrying viscous masses thereon, but it has been found best to use a metal belt, such as one of steel. The length of the belt may be varied according to the space required in the plant. The ends of the belt, when it is installed on the drums, may be welded or joined together to form a smooth surface of the joined ends without interfering with the curvature of the drum or with the film of chocolate mass carried thereon. The tension of the belt may be varied by adjustably sliding the drum 36 on its bearings along the rail 40 of frame 42. The width of the belt is preferably less than that of the drums. In fact, it has been found practical to set the belt on the drum so that the edges of the belt are set in from the edges of the drum. A metal conveyor belt of the kind above described, is found highly efficient in connection with the conditioning of chocolate film mass because of the ease with which heat or cold is conducted therethrough into the body of the chocolate film. It is evident, therefore, that chocolate films carried by the kind of belt described herein are uniformly and thoroughly conditioned without requiring any complicated apparatus.

In order to effectually control the temperature of the belt 56, particularly when it is in use for conditioning films of chocolate, a casing or housing 58 is provided containing an enclosure for drum 36, an inlet or upper conduit 60, and an outlet or lower conduit 62 for belt 56. The casing 58 is a metal container made from a plurality of castings whose edges may be welded together. The casing in its preferred construction will be of even surface, since no bolts or the like are necessary to keep the parts together. The closure portion of the casing is sufficiently large to allow for the sliding movement of drum 36 on its bearings.

The conduits 60 and 62 are integral with the enclosing portion of the casing 58 and are of sufficient overall dimensions to contain the belt 56 and also drum 36, and at the same time to leave sufficient clearance between the wall of the casing and the edge of the belt. In effect, the casing 58 is of U-shaped appearance in which the shorter joining portion is enlarged for retaining the drum 36.

The upper or entrance conduit 60 has its end provided with a groove or slot 64 sufficiently large for the belt and a layer of chocolate thereon to pass therethrough into the conduit. Near the end of conduit 60 is an air outlet duct 66. The lower or exit conduit 62 is provided with a slot 68 to permit the belt 56 and chocolate layer carried thereon to pass out from the casing. The lower conduit 62 is provided with a plurality of air inlet ducts, a main inlet duct 70 disposed near the end of the conduit, and an auxiliary inlet duct 72 disposed near the enclosure portion for drum 36.

The ducts are of relatively larger cross section than that of the conduits, as shown by Fig. 2, and allow for the entrance of a conditioning medium into the casing 58, counter to the movement of the belt 56. While various media, such as brine, water, and other liquids may be suitable, it has been found most practical to use air as a conditioning medium in connection with the present invention.

Both inlet ducts 70 and 72 of the lower conduit contain thermostatically controlled dampers 76 and 78, respectively, pivotally connected to the inner wall of the ducts. The dampers each have an arm 80 extending through the ducts with a counterweight 82 for normally closing the same. The other end of said arm 80 is in connection with a chain 84 mounted on the pulleys 86 and 88. The chain 84 is connected with a thermostatic control box 90 for actuating the movement of damper 76 or 78 against the normal closing movement caused by weight 82. The control box 90 is in turn in communication with a thermostat to be hereinafter described. One or both dampers may be operated by the thermostat to control the flow of a cooling medium into casing 58.

The air entering one or both inlet ducts passes from an air supply and heating unit, not shown, into lower conduit 62 of the casing and into the enclosure for the drum and out through the outlet duct of the conduit 60, the air current stream being counter to the movement of belt 56. It will be noted that the air entering through the inlet ducts of the lower conduit 62 would strike the moving belt 56 and also pass through the clearance spaces on the sides of the belt over to the top and uniformly condition the chocolate carried on the belt, as will be hereinafter described.

In spreading the hot chocolate mass, or for that matter any viscous mass, on the surface of the belt 56, a hopper 92 is disposed above the top of the drum 10, having a front wall 94 whose lower edges make contact with the edge of the inclined wall 96. The wall 94 contains screw shafts 96 passing through the threaded sections of stationary members 98 secured to the side walls of the hopper 94. Said screw shafts 96 extend through the threaded portions on the side edges of plate 94. The unthreaded end of shafts 96 each carries a sprocket wheel 100 carrying a chain 102. One of the shafts has an extension for a hand wheel 104 whereby the vertical adjustment of wall 94 permits a uniform discharge of the mass from the opening of the hopper. It will be noted that by the adjustment of wall 94 against the edge of inclined wall 95 of the hopper, the outflow or discharge of the hot chocolate mass onto the moving endless belt 56 is regulated.

The sides of the upper conduit 60 contain a pair of extending frame members 106 secured thereto for a plurality of vertically adjustable blades. One of the blades 108, nearest the discharge orifice of hopper 92, is curved to permit the chocolate mass flowing from the hopper to be kneaded before being spread onto the belt 56. The blade 108 is vertically adjustable by means of screw shafts 110 and hand wheels 112. By regulating the vertical movement of the blade, the chocolate mass discharging from the hopper 92 is thoroughly kneaded in the space between the discharge orifice of the hopper and the blade 108. This permits proper uniform mixing of the chocolate mass before spreading.

The next blade 114 extends straight across the width of the belt 56, the ends of the same being held by vertical screw shafts 116 onto the members 106 and also being vertically adjustable by hand wheels 118. This blade is adapted to regulate the thickness of the film of chocolate mass to be laid on the moving belt 56.

In order to control the width of the film 120 of chocolate on the belt before being carried into conduit 60 of the casing 58 and to be conditioned, arm blades 122 are provided and secured by means of the vertical screw shafts 124 to the side members 106. These arm blades are disposed at an angle to the edge of the film 120 of chocolate so that by swinging said blades through an arc, the width of the chocolate film 120 may be relatively increased or decreased. The movement of said arm blades 122 are controlled by the hand wheels 126.

From the foregoing, it will be noted that the chocolate mass discharging by gravity from hopper 92 onto the surface of the moving belt 56, is first kneaded due to the adjustment of blade 108 against the surface of the belt 56 to prevent all the chocolate mass from passing at one time through the space formed between the edge of the blade and the belt. After only a certain amount of the chocolate mass is continuously spread out on the belt, the blade 114 regulates the thickness of the film 120, while the arm blades 122 regulate the width of the chocolate film formed on the moving belt.

When the continuously formed chocolate film has been carried through the casing and out from the conduit 62, it is scraped off from the moving belt 56 by a doctor blade 128, said doctor or scraper blade 128 extending the width of the belt 56 is counterweighted at 130 on an arm 131, so that the edge of the blade will be normally in frictional contact against the belt. The scraper blade 128 is pivoted onto the edge of one wall of the chamber of a mixer 132. Said mixer contains a helical screw conveyor 134 whose shaft extends out from the chamber and contains a sprocket wheel 136 on which is a chain 138 carried by the sprocket 140 of the shaft of drum 10. The other end of the shaft of screw conveyor 134 has a spider 142 joined to the upper wall of the mixer 132. After the chocolate film has been scraped the chocolate scrapings are thoroughly mixed in the conveyor so as to make the temperature of the mass as uniformly even as possible.

The mixer 132 has a hopper 144 in communication with the mixing screw chamber into which the uniformly mixed scrapings are conveyed. The hopper 144 is fitted with thermometer apparatus 146, and a thermostat 148. The thermometer indicates the temperature of the chocolate scrapings as they are being conveyed into hopper 144. The thermostat 148 is responsive to the different variations of the temperature of the chocolate scrapings and is in connection with the control box 90 as shown in Fig. 2 for automatically regulating the movement of the damper 76 or 78 or both together. It will be noted that the thermostat may be adjusted to condition the chocolate film carried by the belt 56 to any desired temperature.

While no supports or other means have been described for holding the casing 58 in a permanent position, it is to be noted that any means may be used which is commonly known in the art. Furthermore, pulley guides may be provided alongside the edges of the moving belt to keep it in fixed position on the drums. The slots of the conduits may be of such dimension as to permit only a small amount of air to escape therefrom.

In the method of operating the apparatus for effectually conditioning the chocolate mass to any desired temperature, the motor 32 is started which in turn through the variable speed mechanism 30, drives the drum 10 by means of the belt 24. In turning, drum 10 carries the endless conveyor belt 56 over the other drum 36. When the belt is moving at a desired speed which is regulated by the variable speed transmission mechanism 30, wall 94 of hopper 92 is raised and the chocolate mass therein is gradually discharged. The moving belt 56 carries the chocolate mass against the blade 108 to knead the mass thoroughly and to form on the belt a small film. The thickness of the chocolate film on the belt is regulated by the vertically movable blade 114. After the proper width of the chocolate film 120 has been formed by the adjustment of blades 122, the chocolate film is carried into the casing 58. While the belt is carrying the chocolate film through the casing, streams of preconditioned air or other medium enter the casing through the duct 70 or 72, or both, to affect the mass temperature of the chocolate film. If the temperature of the film is to be reduced, sufficient air is introduced to effect a proper heat exchange from the chocolate film, so that by the time the chocolate film is carried out from the lower conduit 62 the desired temperature of the film will have been attained.

As fast as the film on the moving belt is conditioned, it is scraped and thoroughly mixed in the mixer 132. The resultant heat of the scrapings actuate the thermostat 148 and if the proper temperature of the mass is not attained the entry of air through the ducts 70 and 72 is controlled by the operation of the controls 90.

It will be noted that warm or cold air may be passed into the casing to either warm or temper the chocolate mass carried on the belt. For example, if the temperature of the chocolate mass in the hopper is discharged at 110 to 150° F., and a film formed from said mass is carried through the casing in a direction counter to the inflowing streams of air, the temperature of the resultant scrapings passing into hopper 144, may be reduced to 90° F., or even less, depending upon the quantity and temperature of air allowed to enter the casing.

In Figs. 6 and 7 are shown, diagrammatically, modifications of the embodiment above described. It will be noted that the position of the hopper and the drums is differently arranged and that the structure of the casing is different from that shown in Fig. 2.

From the foregoing detailed description, taken in connection with the drawings, it will be noted that there is provided a device of simple design and construction, and which is comparatively less expensive than many of the devices now on the market. Furthermore, in accordance with this invention, large quantities of viscous materials can be easily conditioned in a highly efficient manner and within a comparatively short time. The device as hereinabove described in accordance with the invention, has been found to be capable of greater output than any other device used for the same purpose now on the market.

By the combination of the drums and the endless belt passing through the chamber of a casing provided with conduits for the belt with the chocolate film thereon, in connection with the hopper and scrapers, a large quantity of chocolate can be treated. The speed of the drums for carrying the belt is variable and easily controlled, so that continuous quantities of chocolate masses of uniform temperature can be obtained preparatory to molding or the like.

The flow of air into the chamber with the conduits is thermostatically controlled. All that is necessary is that a continuous stream of chocolate from the hopper be placed on the belt and scraped down to the proper film thickness before being conditioned in the casing. The film of chocolate carried on the moving belt is accurately maintained and of such small depth that its conditioning is easily effected. The casing 58 is of such dimension that large volumes of air which have been previously conditioned, can be injected therein within very short time. The flow of the air into the casing is controlled by one or more thermostatically operated dampers disposed within the inlet ducts of one of the conduits of the casing.

It is apparent that air at a certain temperature can be admitted into the casing to cool or heat, depending upon the circumstances, the chocolate film on the metal belt traveling through the casing. The conditioned chocolate film is then ready for further treatment. From the above described invention it will be noted that an easy, cheap and flexible method is provided for treating chocolate masses preparatory to molding, which can be modified or changed to suit any special requirements. The apparatus described herein in connection with the invention is easily adapted for continuously conditioning chocolate masses within a relatively short time, and the apparatus may be in different forms as diagrammatically shown.

While several embodiments for conditioning viscous masses have been illustrated in the drawings and described herein, it is apparent that various modifications as to arrangement, materials, size, structure, and form may be made without departing from the spirit and scope of the invention.

Having thus described the invention, what is claimed as new is:—

1. The method of tempering chocolate, which consists in subjecting a hot chocolate mass to a spreading action to form a thin film of uniform depth and width throughout, then passing the film through a cooling medium such as air and exposing all sides of the film, above, below, and the edges thereof to the action of said cooling air for tempering the film of chocolate at the same temperature at any one part of the film, the film being acted upon by equal depths of air at the top, bottom, and sides thereof, subjecting the most cooled part of the film to the colder portion of the cooling air, and the warmest part of the film to the cooling air having abstracted heat therein from the uncooled part of the film, whereby the film is tempered and the constituents of the film are maintained in their relative positions without disturbing their original positions or the homogeneity of the film, and thereby preventing separation of said constituents from each other during the cooling process.

2. An apparatus for tempering chocolate, comprising a casing, an endless thin apron for holding a thin layer of chocolate thereon partly within and partly without the casing, means exterior to the casing for supplying a chocolate mass to the apron and regulating thereon the depth and width of a film of chocolate mass before the film enters the casing, the walls of the casing being parallel with each other at the film inlet and outlet end of the casing, and closely adjacent each other to provide tunnel-like chambers for the passage of the film equidistantly from the walls of the casing, means at each end of the casing for the inlet and outlet of cooling air, the outlet of the cooling air being at the inlet end of the casing where the film enters, and the inlet of the cooling air being at the outlet end of the casing where the film leaves the casing, and means exterior to the outlet end of the casing for scraping off the film from the apron, as it leaves the outlet end of the casing.

3. In a machine for tempering chocolate, a casing having parallel walls, an opening for said casing, a thin apron passing through said opening, said opening being disposed equidistantly in respect to said parallel walls, whereby the apron is equidistantly disposed in respect to said walls, and the air space between the apron and the walls of the casing is equal, at the top, bottom, and sides of the apron, means for supplying said apron with a thin film of hot chocolate mass of substantially uniform depth and width, and means for supplying to said film a current of cooling air in the space between said apron and film, and the parallel walls of the casing, for tempering the chocolate under retention of its constituents during the cooling process in the same relative positions at which they were placed on the apron.

GUDOLF MARINIUS POVERUD.
LEONARD DOTZER.